US011866829B2

(12) United States Patent
Dubois

(10) Patent No.: US 11,866,829 B2
(45) Date of Patent: Jan. 9, 2024

(54) DEVICE AND METHOD FOR MANUFACTURING A COATED METAL STRIP WITH IMPROVED APPEARANCE BY ADJUSTING A COATING THICKNESS USING GAS JET WIPING

(71) Applicant: JOHN COCKERILL S.A., Seraing (BE)

(72) Inventor: Michel Dubois, Boncelles (BE)

(73) Assignee: JOHN COCKERILL S.A., Seraing (BE)

( * ) Notice: Subject to any disclaimer, the term of this patent is extended or adjusted under 35 U.S.C. 154(b) by 0 days.

(21) Appl. No.: 17/775,320

(22) PCT Filed: Nov. 25, 2020

(86) PCT No.: PCT/EP2020/083390
§ 371 (c)(1),
(2) Date: May 9, 2022

(87) PCT Pub. No.: WO2021/105228
PCT Pub. Date: Jun. 3, 2021

(65) Prior Publication Data

US 2022/0396861 A1 Dec. 15, 2022

(30) Foreign Application Priority Data

Nov. 29, 2019 (EP) .................................... 19212714

(51) Int. Cl.
*C23C 2/20* (2006.01)
*C23C 2/40* (2006.01)
(Continued)

(52) U.S. Cl.
CPC .................. *C23C 2/20* (2013.01); *C23C 2/40* (2013.01); *C23C 2/524* (2022.08); *B05C 3/125* (2013.01); *B05C 11/06* (2013.01)

(58) Field of Classification Search
CPC B05C 11/06; B05C 3/125; C23C 2/20; C23C 2/40; C23C 2/524; C23C 2/52
See application file for complete search history.

(56) References Cited

U.S. PATENT DOCUMENTS 5,332,437 A * 7/1994 Davene ..................... C23C 2/20 427/349
5,702,528 A * 12/1997 Paramonov ............. C23C 2/006 118/623

(Continued)

FOREIGN PATENT DOCUMENTS

JP H06 292854 A 10/1994
WO WO 2005/010229 A1 2/2005

(Continued)

*Primary Examiner* — Karl Kurple
(74) *Attorney, Agent, or Firm* — LEYDIG, VOIT & MAYER, LTD.

(57) ABSTRACT

A gas wiping device for controlling a thickness of a coating layer deposited on a running metal strip plated with molten metal in an industrial hot-dip installation includes: a main nozzle unit and a secondary nozzle unit, for blowing a wiping jet on a surface of the running strip, the main nozzle unit and secondary nozzle unit respectively including a main and secondary chamber fed by pressurized non-oxidizing gas and at least a main and secondary elongated nozzle slot formed in a tip of the respective main and secondary nozzle units, the tips each including an external top side, facing a downstream side of the running strip, and making an angle with the surface of the running strip. The secondary nozzle unit is adjacent the main nozzle unit over an external top side of the main nozzle unit tip.

15 Claims, 8 Drawing Sheets

(51) Int. Cl.

| | |
|---|---|
| ***C23C 2/00*** | (2006.01) |
| *B05C 3/12* | (2006.01) |
| *B05C 11/06* | (2006.01) |

(56) References Cited

U.S. PATENT DOCUMENTS

| | | | | | |
|---|---|---|---|---|---|
| 10,138,551 | B2 * | 11/2018 | Colvin | C23C 16/46 | |
| 2007/0001910 | A1 * | 1/2007 | Yamanaka | H01Q 13/02 | 343/700 MS |
| 2009/0159233 | A1 * | 6/2009 | Takeda | C23C 2/20 | 164/461 |
| 2011/0177253 | A1 * | 7/2011 | Oohashi | C23C 2/06 | 427/432 |
| 2011/0185969 | A1 * | 8/2011 | Yang | C30B 25/10 | 118/666 |
| 2012/0107636 | A1 * | 5/2012 | Diez | B32B 15/18 | 427/349 |
| 2014/0204975 | A1 * | 7/2014 | Kosakai | G01K 13/00 | 374/100 |
| 2014/0366802 | A1 * | 12/2014 | Itoh | C23C 2/185 | 118/712 |
| 2016/0047027 | A1 * | 2/2016 | Langevin | C23C 2/40 | 165/286 |
| 2016/0122854 | A1 * | 5/2016 | Schwander | C23C 2/003 | 118/712 |
| 2018/0291493 | A1 * | 10/2018 | Diez | C23C 2/16 | |
| 2018/0371596 | A1 * | 12/2018 | Sohn | C21D 6/005 | |
| 2020/0047234 | A1 * | 2/2020 | Yonekura | B21D 26/14 | |
| 2021/0213454 | A1 * | 7/2021 | Jones | B01L 3/5027 | |
| 2021/0332468 | A1 * | 10/2021 | Kweon | C23C 2/00 | |
| 2021/0381092 | A1 * | 12/2021 | Dubois | C23C 2/24 | |
| 2022/0349038 | A1 * | 11/2022 | Gaensbauer | C22F 1/04 | |
| 2022/0367236 | A1 * | 11/2022 | Mustafa | C23C 16/46 | |
| 2022/0396861 | A1 * | 12/2022 | Dubois | C23C 2/524 | |

FOREIGN PATENT DOCUMENTS

| | | | |
|---|---|---|---|
| WO | WO 2008/069362 | A9 | 6/2009 |
| WO | WO 2010/130883 | A1 | 11/2010 |
| WO | WO 2014/199194 | A1 | 12/2014 |

* cited by examiner

DEVICE AND METHOD FOR MANUFACTURING A COATED METAL STRIP WITH IMPROVED APPEARANCE BY ADJUSTING A COATING THICKNESS USING GAS JET WIPING

CROSS-REFERENCE TO PRIOR APPLICATIONS

This application is a U.S. National Phase application under 35 U.S.C. § 371 of International Application No. PCT/EP2020/083390, filed on Nov. 25, 2020, and claims benefit to European Patent Application No. EP 19212714.0, filed on Nov. 29, 2019. The International Application was published in English on Jun. 3, 2021 as WO 2021/105228 under PCT Article 21(2).

FIELD

The present invention relates to a device and a corresponding method for improving the surface appearance of a hot-dip coated metal strip having a coating thickness adjusted by gas jet wiping.

The solution prescribed in the present application applies more particularly to metal strips coated with magnesium in a mixture of zinc and aluminium.

BACKGROUND

The coating process consisting in dipping a metal strip in a bath of molten metal is well known and used all over the world, especially in the case of coating a steel strip with zinc, aluminium, tin or alloys of those main metal elements to which others may be added such as magnesium, silicon, chromium, strontium, vanadium as well as impurities like Ti, Fe, Ca, etc.

SUMMARY

In an embodiment, the present invention provides a gas wiping device for controlling a thickness of a coating layer deposited on a running metal strip plated with molten metal in an industrial hot-dip installation, comprising: a main nozzle unit and a secondary nozzle unit, configured to blow a wiping jet on a surface of the running strip, the main nozzle unit and secondary nozzle unit respectively comprising a main and secondary chamber fed by pressurized non-oxidizing gas and at least a main and secondary elongated nozzle slot formed in a tip of the respective main and secondary nozzle units, the tips each comprising an external top side, facing a downstream side of the running strip, and making an angle with the surface of the running strip, wherein the secondary nozzle unit is adjacent the main nozzle unit over an external top side of the main nozzle unit tip, such that an upper external surface of the secondary nozzle unit forms an angle of between 5° and 45° with the surface of the running strip surface, wherein a thickness of the second slot opening is between 1.5 and 3 times a thickness of the first slot opening, wherein a tip of the secondary nozzle unit has an external top side prolonged downstream by a first baffle plate making a first angle with respect to the running strip, so as to form a gas confinement region, and wherein the gas wiping device further comprises: an actuator configured to adjust a distance between a tip of the first baffle plate and the running strip, the first baffle plate being mounted pivotably with respect to the second nozzle upper surface using a hinge, such that the actuator is configured to modify an angle between the first baffle plate and the second nozzle upper surface; and an oxygen sensor in the gas confinement region, close to a second slot opening of the secondary nozzle unit, the oxygen sensor being configured to measure an amount of oxygen close to the running strip, downstream of a nozzle location, so as to provide a measurement to activate the actuator so as to modify a geometry of the gas confinement region, by varying a distance, in order to reduce an oxygen content in the gas confinement region or to keep the oxygen content in the gas confinement region below a predetermined threshold.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 9 represents comparative simulation diagrams of oxygen's distribution (expressed in mole fraction), depending on the quantity of gas supply (i.e. gas flow rate) of the second nozzle.

DETAILED DESCRIPTION

Figure 1:
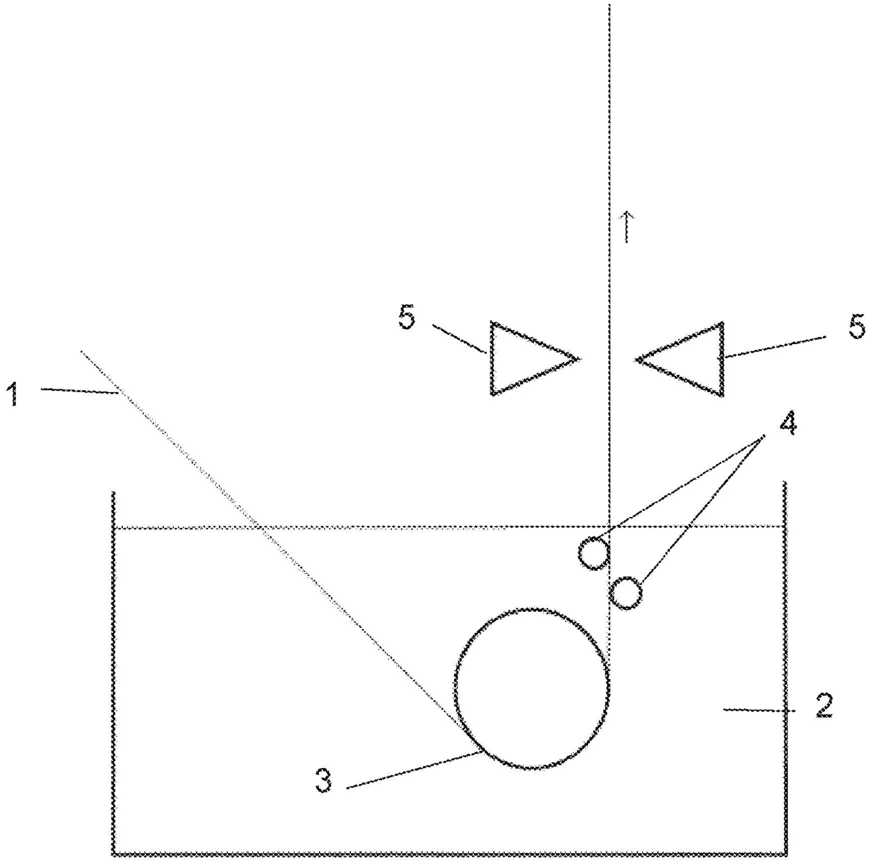
FIG. 1 PRIOR ART
FIG. 1 schematically represents a hot-dip coating installation according to prior art.

As shown in FIG. 1, a strip 1 is firstly dipped in the molten metal bath 2, then deflected by submerged rolls, usually a sink roll 3 and (a) deflecting roll(s) 3(, 4) to finally come out of the bath 2 upward. It is known that the thickness of liquid metal conveyed by the strip owing to viscosity of the liquid increases with the speed of the strip. Therefore, to reduce that thickness to a target value defined by the final customer, wiping of excess liquid is required. The most usual method used to perform that operation consists in utilizing the air knife principle. According to this method, a gas is blown at high speed through one or more nozzles 5 often called "air knives" (see FIG. 1) onto the running strip conveying the liquid metal. Usually there is at least one gas nozzle 5 on each side of the strip, an additional nozzle being possibly provided to control edge overcoating. The impingement of the high speed gas onto the strip creates pressure and shear stress profiles on the conveyed liquid film that force the excess of liquid to return to the coating bath.

Figure 2:
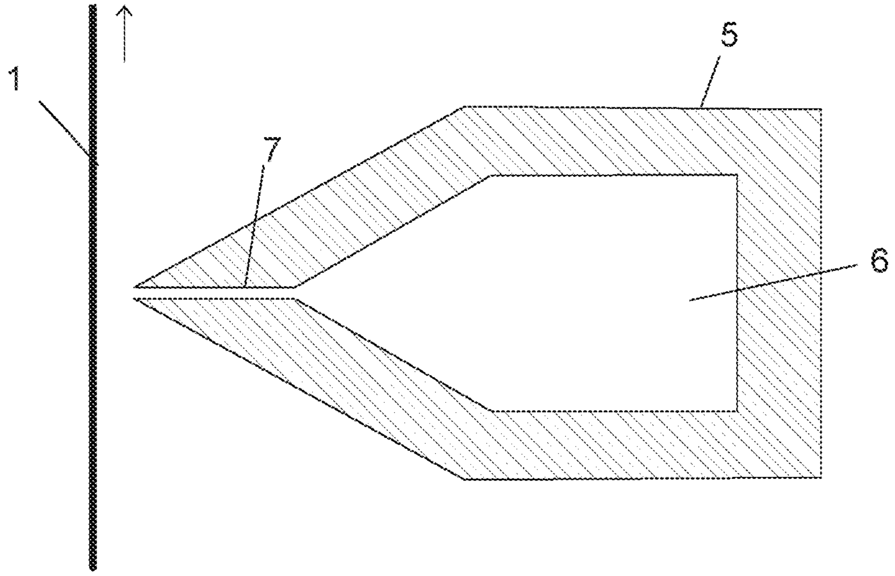
FIG. 2 PRIOR ART
FIG. 2 schematically represents a high speed wiping gas nozzle unit used in hot-dip coating installations according to prior art.

The high speed gas nozzle that works like a knife on the liquid film is produced by the gas exhaust from a chamber under pressure 6 through a slot 7 having a length transverse to the running strip and a small thickness (FIG. 2). The gas used can be of any type including combustion gas and steam for example but the most usual method consists in using air for cost and availability reasons and nitrogen when a high surface quality is desired.

Typical values used in the zinc coating method for example are a steel strip running from 20 to 250 meter per minute with a coating thickness comprised between 2 and 40 microns, which requires a gas exiting from a chamber through a single slot opening which thickness is comprised between 0.7 to 2 mm at velocities comprised from 50 m/s to values up to sound velocity (close to 300 m/sec).

A drawback occurring when liquid metal is wiped by an oxidizing gas such a gas containing oxygen and/or water, like air, is an oxidation of the liquid film. This implies that the physical properties of the coating liquid are thereby changed, as for example its viscosity due to the effect of the small oxidized part of the film on the surface thereof but also internally. As it is also known, the gas jet is not totally stable after its exit in ambient environment, with the occurrence of high shear stress between the gas jet and the liquid film, and, as a result, waves can be formed in the coating. These are induced by oscillation of the wiping forces on the liquid film.

Those waves level off with time more or less depending on the liquid viscosity, its surface tension, the coating thickness and the residence time in liquid state. Therefore, reduction of the oxidation of the liquid film improves the surface quality and especially the undulation of the finished film.

Other defects such as tiny transversal oxide lines may also be observed owing to oxidation but this mostly occurs when the Al+Mg content of the coating is high and the wiping jet strong.

This explains why, when high quality surfaces are desired, the use of a non-oxidizing gas is preferred instead of air. In addition, the dew point of the gas must be low to ensure that oxidation by water cannot happen as it would be the case when using combustion gas. If various gases might be used like the so-called noble gases (Xe, Ne, Ar, etc.), nitrogen is the preferred medium thanks to its availability and further its impact on manufacturing costs.

Figure 3:
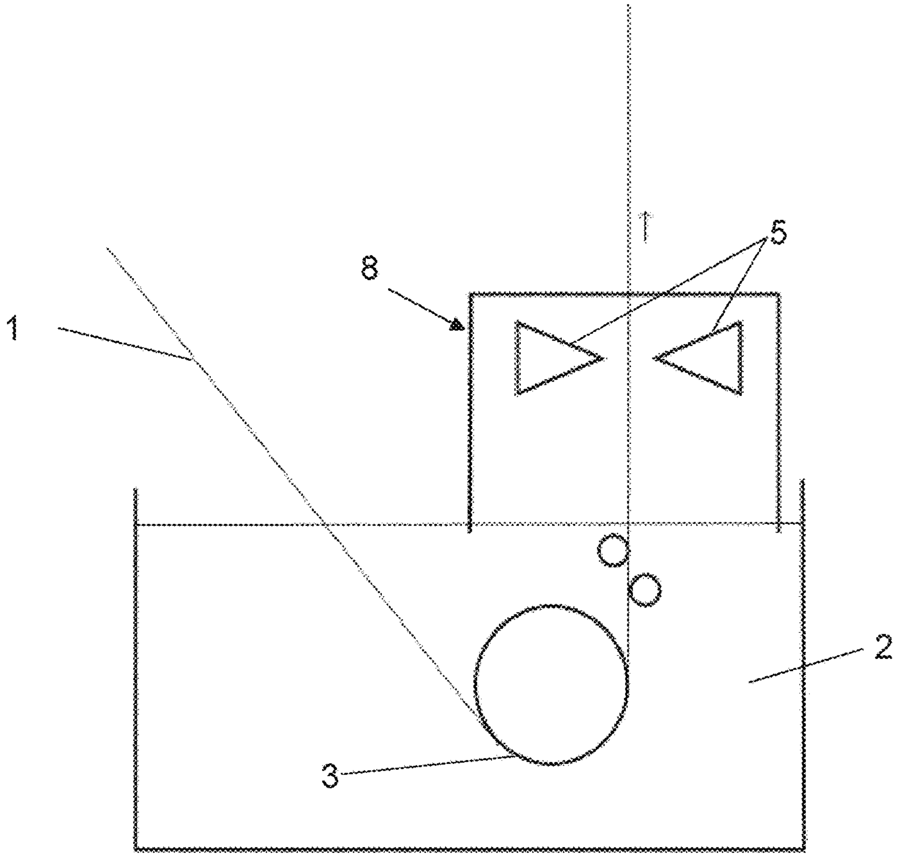
FIG. 3 PRIOR ART
FIG. 3 schematically represents a hot-dip coating installation provided with a confinement box according to prior art.

When a non-oxidizing gas is used to feed gas knives, the oxygen content of the ejected gas progressively increases however as soon as the gas jet enters into ambient air thanks to conveying of the latter. This means that the oxygen content of the injected gas progressively increases with the distance from the nozzle exit to the strip. It is therefore known that the higher the nozzle slot-to-strip distance the higher the oxygen content will become in the gas actually impinging onto the liquid metal. This justifies a former patented practice consisting in using a confinement box 8 around the nozzles 5, as very schematically shown in FIG. 3, to keep a low oxidizing atmosphere around the non-oxidizing gas jet.

A more complex example of confinement box is described in document WO 2014/199194 A1 which discloses an installation for hot dip coating of a metal strip comprising an adjustable confinement box. The installation comprises: means for moving said metal strip along a path, a pot for containing a melt bath, and a wiping system comprising at least two nozzles placed on either side of said path downstream the pot, the wiping system having a box with a lower confinement part for confining an atmosphere around the metal strip upstream of said nozzles and an upper confinement part for confining the atmosphere around the metal strip downstream of said nozzles, said wiping system having first moving means for vertically moving the lower confinement part with respect to the pot. The nozzles are vertically movable relative to the pot. The wiping system also comprises second moving means for vertically moving the upper confinement part with respect to both the pot and the lower confinement part.

A solution that has also been proposed is a confinement box located downstream just over the nozzle, fed with a non-oxidizing gas by a dedicated system consisting in pipes. Such a system is however quite complex as the box has lateral and top sides and one has to manage the edge baffle system that is used to control the edge over coating. In addition, it must be located quite close to the strip to be efficient and keep the oxidizer level low compared to ambient environment.

An example of such a confinement box is described in document WO 2010/130883 A1, which relates to a method for producing a metal band with a metal coating that provides protection against corrosion, comprising a step of passing the band through a containment area defined:

(a) at the bottom by the wiping line and the upper outer faces of the wiping nozzles,
(b) at the top by the upper portion of two containment casings placed on either side of the band just above the nozzles and having a height of at least 10 cm in relation to the wiping line, and
(c) at the sides by the side portions of said containment casings.

The atmosphere in the containment area has an oxidising potential less than that of an atmosphere containing 4 vol.-% oxygen and 96 vol. % nitrogen and greater than that of an atmosphere containing 0.15 vol.-% oxygen and 99.85 vol.-% nitrogen.

The confinement boxes, although being very efficient to avoid oxidant potential of the wiping gas on its way toward the strip, create operational problems like creation of skimming that needs to be removed, or dirt due to zinc dust generation and need of slot cleaning as the access to the bath and the nozzle slot are not possible anymore.

Finally, the solutions of the type "confinement box" which have been known now for 30 years have proven to be industrially impracticable especially at high line speed, such as 100 mpm and over, and seem to be more and more abandoned industrially.

Moreover, the inventors have identified that, when the line speed is higher than 60 mpm and the coating thickness is below 30 μm, specific defects occur that are not due to a film oxidation located between the bath surface and the air knife but rather to a film oxidation located after the wiping gas impingement spot because at that location the relative velocity of the wiping gas and the top of the coating is high whereas the coating is close to its finished status.

Figure 4:
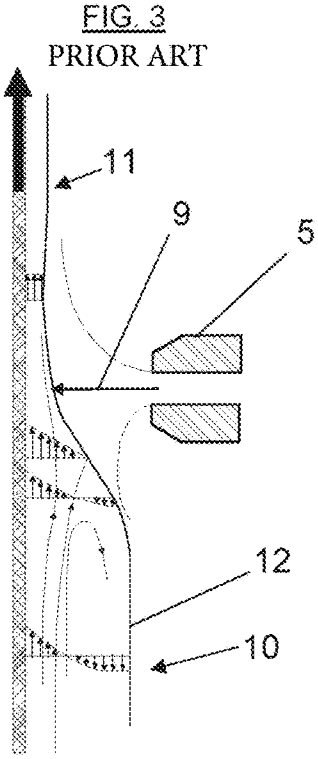
FIG. 4 PRIOR ART
FIG. 4 depicts a typical coating film changes while passing under the air knife.

FIG. 4 shows a typical theoretical film evolution under the gas knife. The physics of the process indicates that, in the after-wiping area 11, the coating thickness 12 can still decrease due to the high shear stress induced by the gas flow moving in the same direction than the strip. A high relative velocity induces a strong oxidation of the liquid film when the wiping gas is oxidizing the coating metal and thus impacts the final surface quality.

Document WO 2008/069362 A9 discloses a gas wiping apparatus which includes a body containing a high pressure gas and a multiple nozzle unit disposed at the body to eject the high pressure gas onto a surface of a moving coated steel strip. The surface of the coated steel strip passing through a hot dipping bath filled with the molten metal is wiped by a high speed gas jet. The gas ejected from the auxiliary nozzles surrounds the gas ejected from the main nozzle, thereby preventing zinc chips from splashing caused by the gas ejected from the main nozzle, even at a high-speed and the steel strip can be adjusted in the coating thickness stably and uniformly.

Document WO 2005/010229 A1 relates to a method and device for hot-dip coating a metal strip. Once it has left the molten bath, the still molten metal coating which is present on a surface of the metal strip is blown off the metal strip by means of at least one gas flow emanating from a stripping nozzle to achieve a specific coating strength for the final remaining coating on the surface which is respectively impinged upon by the gas flow.

The gas flow flowing off the respective surface of the metal strip is sucked off by means of a suctioning device which is arranged in the vicinity of the stripping nozzle and the surface of the metal strip.

In this way, the formation of a gas stream flowing parallel to the strip surface is reliably prevented, which on the one hand promotes the oxidation of the coating metal applied to the strip surface and on the other hand would promote the formation of equally undesirable drainage structures. In the procedure according to this invention, the gas stream is instead removed in a controlled manner, and as soon as possible after the gas stream has impacted on the strip surface assigned to it. The occurrence of surface defects and the risk of excessive oxidation of the coating material are thus reduced to a minimum.

In document US 2009/159233 A1, a gas wiping nozzle is used which includes a primary nozzle portion and at least one secondary nozzle portion provided either or both above and below the primary nozzle portion. The secondary nozzle portion jets a gas in a direction tilted from the direction in which the primary nozzle portion jets the gas, and the secondary nozzle portion jets the gas at a lower flow rate than the primary nozzle portion. The gas wiping nozzle has a tip whose lower surface forms an angle of 600 or more with the steel strip. By jetting a gas from the secondary nozzle portion at predetermined conditions, the gas jet can scrape molten metal effectively. By controlling the angle between the lower surface of the gas wiping nozzle and the steel strip, the plating can be scraped more effectively. Thus, the molten metal can be appropriately scraped without excessively increasing the gas pressure. Consequently, splashes can be reduced.

In document JP H06 292854 A, a jet stripping apparatus comprises a stripping nozzle positioned to direct a stripping gas jet stream against each side of a steel strip emerging from a bath of molten zinc or aluminium/zinc alloy with a layer of bath material thereon, means to supply gas to said stripping nozzle at a pressure sufficient to liberate a relatively strong stripping jet stream therefrom, and surface modifying means spaced closely below said stripping nozzle effective to smooth the surface of said layer prior to it reaching the stripping jet stream. Said surface modifying means preferably comprise a smoothing nozzle positioned to direct a relatively weak surface modifying gas jet stream against the layer that is effective to smooth the layer but not to substantially affect the quantity of material passing it.

The present invention aims to overcome the drawbacks of prior art.

In particular, the invention is intended to improve the appearance of a strip dip-coated with a metal liquid layer whose thickness is adjusted by gas jet wiping, owing to decrease of wiping non-oxidizing gas dilution in air.

A goal of the invention is also to prevent or minimize the well-known defects of the method such as surface waviness after wiping, cloudy aspect and sag lines, pinhole defects used to appear at high pressure and with thin coatings, etc.

A first aspect of the present invention relates to a gas wiping device for controlling the thickness of a coating layer deposited on a running metal strip plated with molten metal in an industrial hot-dip installation, comprising a main nozzle unit and a secondary nozzle unit, to blow a wiping jet on the surface of the running strip, said main nozzle unit and secondary nozzle unit being respectively provided with a main and secondary chamber fed by pressurized non-oxidizing gas and with at least a main and secondary elongated nozzle slot formed in the tip of the respective main and secondary nozzle units, said tips comprising each an external top side, facing in use the downstream side of the running strip, and making an angle with the running strip surface, wherein the secondary nozzle unit is adjacent the main nozzle unit over the external top side of the main nozzle unit tip, so that the upper external surface of the secondary nozzle unit is designed to form, in use, an angle with the running strip surface comprised between 5° and 45°, and wherein the thickness of the second slot opening is comprised between 1.5 and 3 times the thickness of the first slot opening. According to the invention, the tip of the secondary nozzle unit has an external top side prolonged downstream by a first baffle plate making a first angle in use with respect to the running strip, so as to form a gas confinement region.

Considering that the metal strip is generally running upwards (see figures), each nozzle unit is expected to generally have a tapered shape with a lower external surface (or external bottom side) and an upper external surface (or external top side) in this respect. The term "downstream" means beyond, considering the upward direction of the strip (e.g. downstream/beyond the gas impingement point/spot on the strip). The tip of each nozzle unit is the region comprising the gas exit slot.

According to particular embodiments, the device further comprises at least one of the following characteristics or a suitable combination thereof:

- the difference of the distance in use between the slot of the secondary nozzle unit and the running strip and the distance in use between the slot of the main nozzle unit and the running strip is comprised between 5 and 30 mm, the slot of the secondary nozzle unit being behind the slot of the primary nozzle unit in the direction away from the running strip;
- the first baffle plate is prolonged at an end distal from the secondary nozzle unit tip by a second baffle plate making a second angle in use with respect to the running strip, so as to form a gas confinement region with the secondary nozzle unit tip and the first baffle plate;
- the second baffle plate is essentially transverse/perpendicular with respect to the running strip;
- the orthogonal projection of the slot of the second nozzle unit on the running strip in use is located at least at 50 mm downstream over (beyond) an impingement spot of the wiping gas of the main nozzle unit;

the orthogonal projection of the second baffle plate tip (free end) on the running strip in use is located at least at 75-100 mm downstream over (beyond) an impingement spot of the wiping gas of the main nozzle unit, so that the length of the confinement region can be considered to be about 75-100 mm;

the distance running strip—second baffle plate is comprised between 5 and 30 mm (the above-mentioned distance is the distance between the strip and a free end of the second baffle plate);

the distance running strip—first baffle plate (i.e. the shortest distance thereof) or the distance running strip—second baffle plate (see above) is higher than the distance running strip —main nozzle unit;

said main and secondary chambers are non-communicating chambers, so that the nature of the gas or the gas flow rates can be different;

the device comprises:

an actuator capable to adjust a distance between a tip of the first baffle plate and the running strip, said first baffle plate being mounted pivotable in respect of the second nozzle upper surface thanks to a hinge, so that said actuator is capable to modify an angle between said first baffle plate and said second nozzle upper surface;

an oxygen sensor provided in the gas confinement region, close to the second slot opening of the secondary nozzle unit, for measuring the amount of oxygen close to the running strip, downstream of the nozzle location, said measurement allowing to activate the actuator and further to modify the geometry of the gas confinement region, especially by varying said distance, in order to reduce, when needed, the oxygen content in the gas confinement region, or to keep the oxygen content below a predetermined threshold therein.

Another aspect of the invention concerns a gas wiping system comprising several transverse compartments, each compartment having a gas wiping device as described above, said compartments being located in use over the width of the running strip, for modifying the gas wiping jets independently in each compartment.

Still another aspect of the invention concerns a method for controlling the thickness of a coating layer deposited on a running metal strip in an industrial hot-dip installation, using the gas wiping device described herein, wherein:

a first pressurized non-oxidizing gas jet is blown through the main nozzle unit on the metal strip plated with molten metal coming out of a hot-dip pot;

a second pressurized non-oxidizing gas jet is blown through the secondary nozzle unit on the metal strip plated with molten metal coming out of a hot-dip pot, the impingement spot of the second gas jet being located close to or downstream the impingement spot of the first gas jet, considering the running direction of the strip;

the gas flow rate coming out of the secondary nozzle unit being controlled and lower than 40% of the gas flow rate coming out of the main nozzle unit.

According to particular embodiments, the method further comprises at least one of the following characteristics or a suitable combination thereof:

the gas flow rate coming out of the secondary nozzle unit is comprised between 5 and 30% of the gas flow rate coming out of the main nozzle unit;

the gas flow rate coming out of the secondary nozzle unit is comprised between 10 and 20% of the gas flow rate coming out of the main nozzle unit;

the gas velocity at the exit of the second slot is lower than 50 percent of the gas velocity at the exit of the main slot;

the pressurized gas is nitrogen.

Adopting a scientific approach and making trials led however the inventors to show that installing a complete confinement box over the main nozzles is not required to keep a low gas oxidant potential after wiping and so to reduce oxidation of the liquid film beyond the impingement point of the gas jet on the strip. According to the invention, when a suitable flow of non-oxidizing gas is laid down properly over the main gas jet, the mixture of the oxidizing gas with the ambient gas can be suitably limited. In addition, it is known that such an additional flow, when properly managed, improves the stability of the gas jet on its travel toward the strip.

Figure 5:
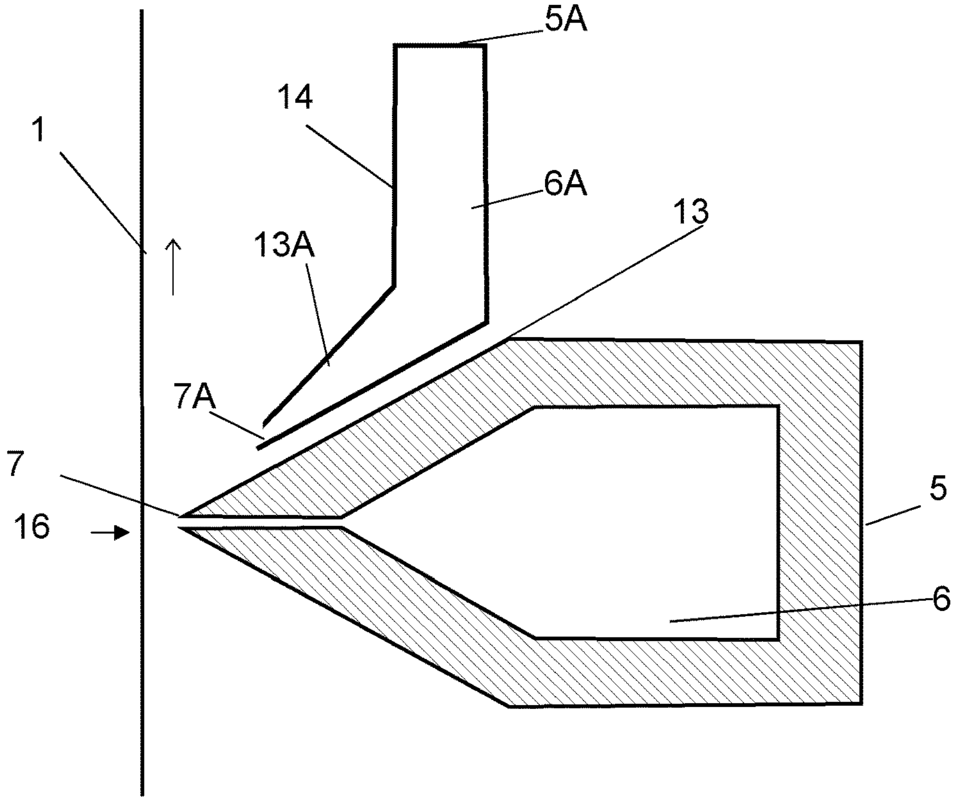
FIG. 5 schematically illustrates a first embodiment of the present invention, with a secondary nozzle unit and a first baffle plate for creating a confinement region.
Figure 6:
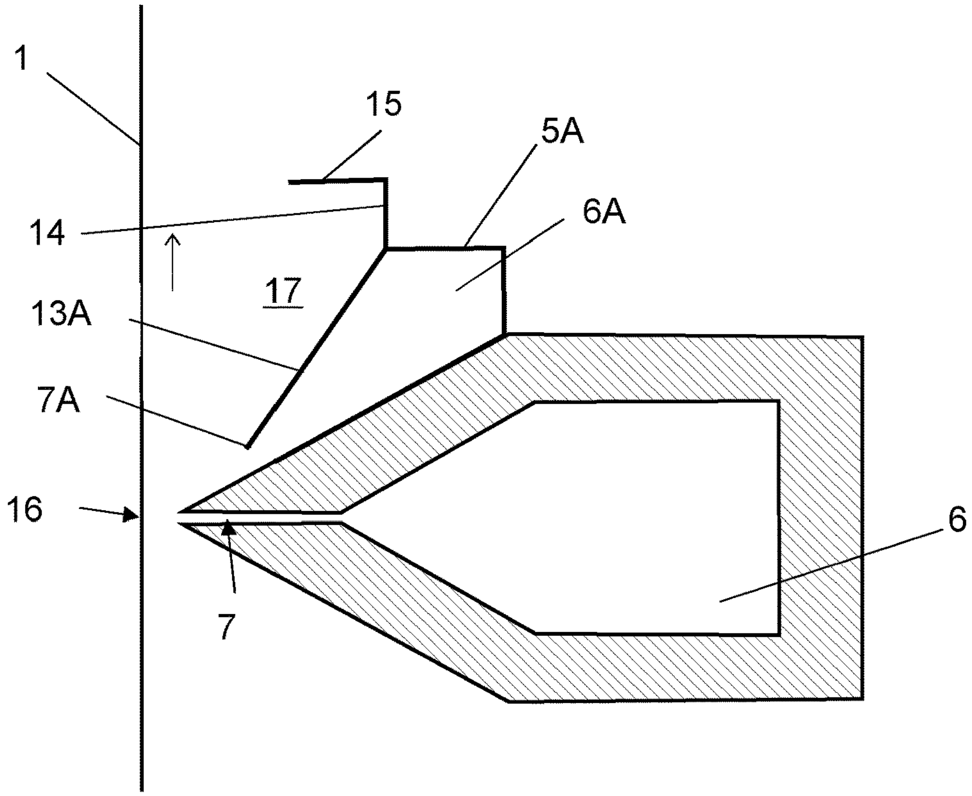
FIG. 6 schematically illustrates a second embodiment of the present invention, with a secondary nozzle unit and first and second baffle plates for creating a confinement region.

As shown in FIG. 5 and FIG. 6, the inventors have discovered that the most practical way to do that consisted is adding a second nozzle 5A with a corresponding second slot 7A just over the main nozzle 5 with delivery of a gas having proper flow and velocity. However if the flow added by the second slot 7A is not in a right range of mass flow and velocity it will negatively impact the final coating thickness as well as the gas knife stability.

The present invention thus consists in providing an additional non-oxidizing gas (mass) flow rate lower than 40% of the main flow, expressed in kg per second and per meter of nozzle. This flow rate will be preferably between 10 and 20% of the main flow rate to avoid a significant impact on the wiping effect due to the main jet. In addition to the flow rate concerned, the gas velocity of the additional gas must be low to minimize its interaction on the knife efficiency. Therefore the second slot 7A opening size according to the invention will be higher than the one of the main slot 6A and most preferably between 1.5 and 3 times the main slot opening size.

As an example, if the main slot 6A is 1 mm thick and the gas flow rate is 0.2 kg/sec/m of pure nitrogen, the second slot 7A will be 2 mm thick with a flow rate from 0.02 to 0.04 kg/sec/m.

In order not to modify the wiping effect of the main gas jet, the additional non-oxidizing gas must be smoothly laid down on the main jet. This means in practice that the second slot 7A should not be too close to the exit of the main slot 7, and rather should be typically between 10 and 30 mm away and behind the main nozzle 5 exit. In addition, the second flow must be added to the main flow along the top side 13 of the main nozzle 5 (the strip is supposed to move upwards or the top side of the nozzle is the side thereof located downstream the strip movement). Precise values cannot be given due to a variety of possible designs available according to the invention but the inventors prescribe designs able to get a laminar deposit of the additional flow, such as in the configuration shown in FIG. 5.

In addition to flow rate considerations, the general geometry of the nozzle configuration on the after-wiping side is critical in order to keep a type of confinement effect. The inventors have observed that if the (w)edge formed by the strip 1 and the second nozzle top side 13A per se is too open, the confinement will be too low. In addition, experiments have shown that the addition of a small baffle plate 14 to the nozzle top side 13A, which is for example aligned parallel to the strip 1, gives improvement in the confinement 17

(FIG. 5) but while keeping a strip-to-plate distance higher than the nozzle-to-strip distance, preferably about 20 mm in all industrial conditions.

Tests have been run departing from a main nozzle 5 according to prior art as shown on FIG. 2. This nozzle typically has a top side that makes an angle with the strip between 400 and 60°, preferably between 50° to 60°. The opening of the nozzle is typically 1 mm. The additional nozzle 5A has a wider opening 7A, and preferably comprised between 1.5 and 2.5 times the size of the main opening, so comprised between 1.5 and 2.5 mm in this case. The tip of the additional nozzle 7A is located at a couple of millimetres behind the main nozzle 5 and preferably between 5 and 15 mm behind it (i.e. going away from the strip).

The angle formed by the top side 13A of the second nozzle 5A and the strip is higher than 5° but less than 45°, to assure proper confinement as already mentioned. The top side 13A of the second nozzle 5A is prolonged downstream (or upward in the case of FIGS. 5 and 6) by a baffle plate 14 which can be parallel in use to the strip 1. Moreover, an additional baffle plate 15 is advantageously added essentially perpendicular to the strip 1 and attached to the 2nd nozzle 5A (and to its parallel baffle plate 14) to further improve confinement 17 (FIG. 6). This plate 15 is located at least at a distance of about 75-100 mm over the impingement spot 16 of the main nozzle 5 but certainly lower than 200 mm, as after this distance, the shear flow of the liquid film should become very low.

The second nozzle 5A has a gas supply (i.e. a gas flow rate) comprised between 5% and 30% of the main nozzle 5 gas supply and preferably between 10% and 20% thereof.

Experiments have shown that when the second flow rate is 20% of the main one and the second slot twice the size of that of the main opening, the oxygen content could be kept below 8% and actually even lower than to 4-5% of the gas mixture mass when the main nozzle-to-strip distance is below 12 times the main nozzle opening thickness.

Figure 8:
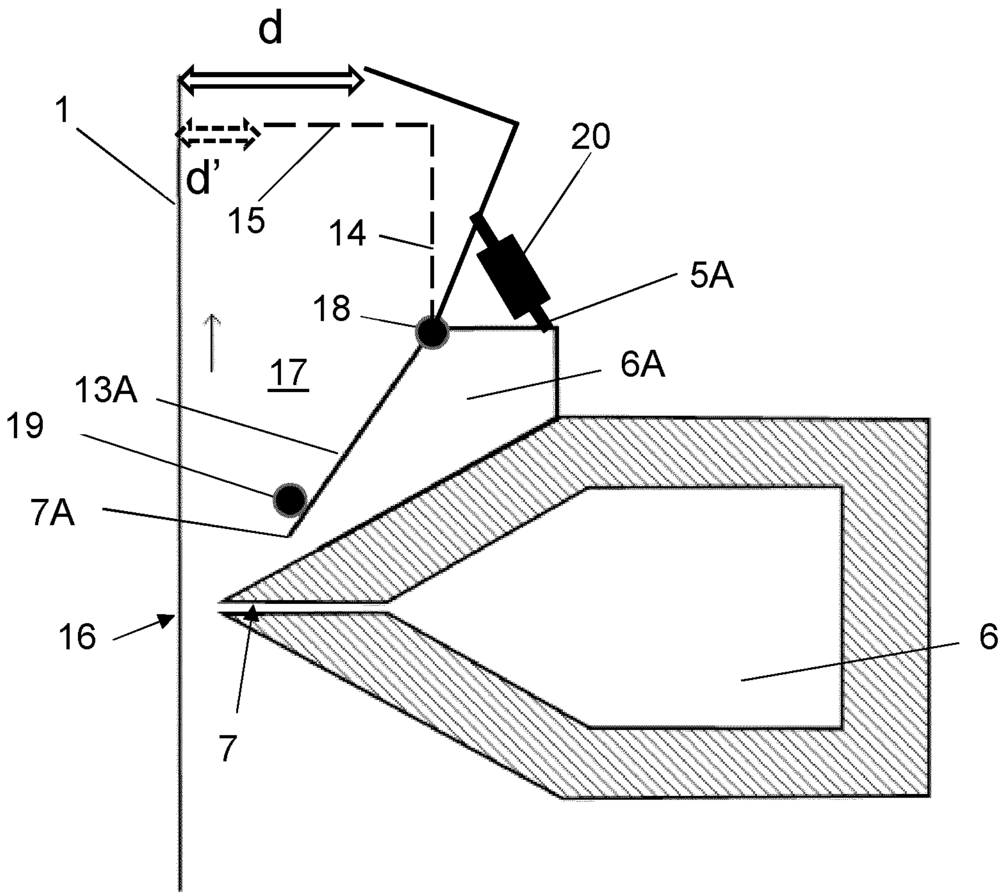
FIG. 8 schematically illustrates a third embodiment of the present invention, with a secondary nozzle unit and first and second baffle plates for creating a confinement region, the distance between the first baffle plate and the strip being adjustable via an actuator.

In a particular embodiment of the present invention (FIG. 8), the distance between the first baffle plate 14 and the running strip 1 is adjustable via an actuator 20 (e.g. electric, hydraulic). A hinge 18 is provided between the first baffle plate 14 and the second nozzle upper surface 13A, and the actuator is able to modify the angle between these two elements, via the hinge 18. So the distance d (resp. d') between the first baffle plate tip (or the second baffle plate tip, in a variant embodiment) and the running strip 1 can be varied by the actuator 20. An oxygen sensor 19 is further provided in the confinement region 17, close to the slot 7A of the secondary nozzle unit 5A. This sensor 19 allows to measure the amount of oxygen close to the strip, downstream of the nozzle location. This measurement then allows to activate the actuator 20 and modify the geometry of the gas confinement region 17 (for example by reducing distance d), in order to reduce, when needed, the oxygen content in the confinement region 17, or to keep the oxygen content below a predetermined threshold. In this way, the confinement region is adaptable, depending on the concentration of oxygen measured by the sensor 19.

In still a particular embodiment of the invention, the gas wiping device can comprise several transverse compartments, having each a wiping system with the first and second nozzles 5 and 5A, as described above, located over the width of the running strip 1. Preferably, such a gas wiping device is able to modify the gas wiping jets independently over the width (e. g. central and edge parts respectively) of the running strip 1, according to the requirements. This system is also able to easily adapt to different strip widths.

EXAMPLE

Figure 7:
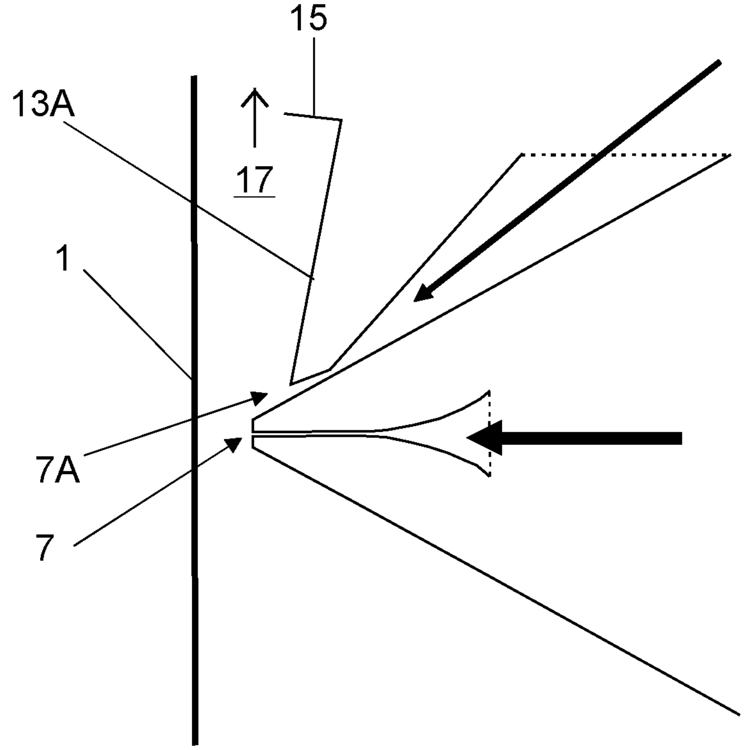
FIG. 7 schematically represents a tested particular nozzle configuration according to the present invention.

Typical data for a tested embodiment in the configuration of FIG. 7 are the following:

Main nozzle: 1 mm thick, N2 flow: 0.2 kg/sec/m;
2nd nozzle: 2 mm thick; N2 flow: 0.04 kg/sec/m;
Wiping distance: 10 mm;
Length of transverse top plate: 10 mm;
Length of confined zone: 75 mm;
Secondary nozzle top side angle (with the strip): 10°.

Figure 9A:
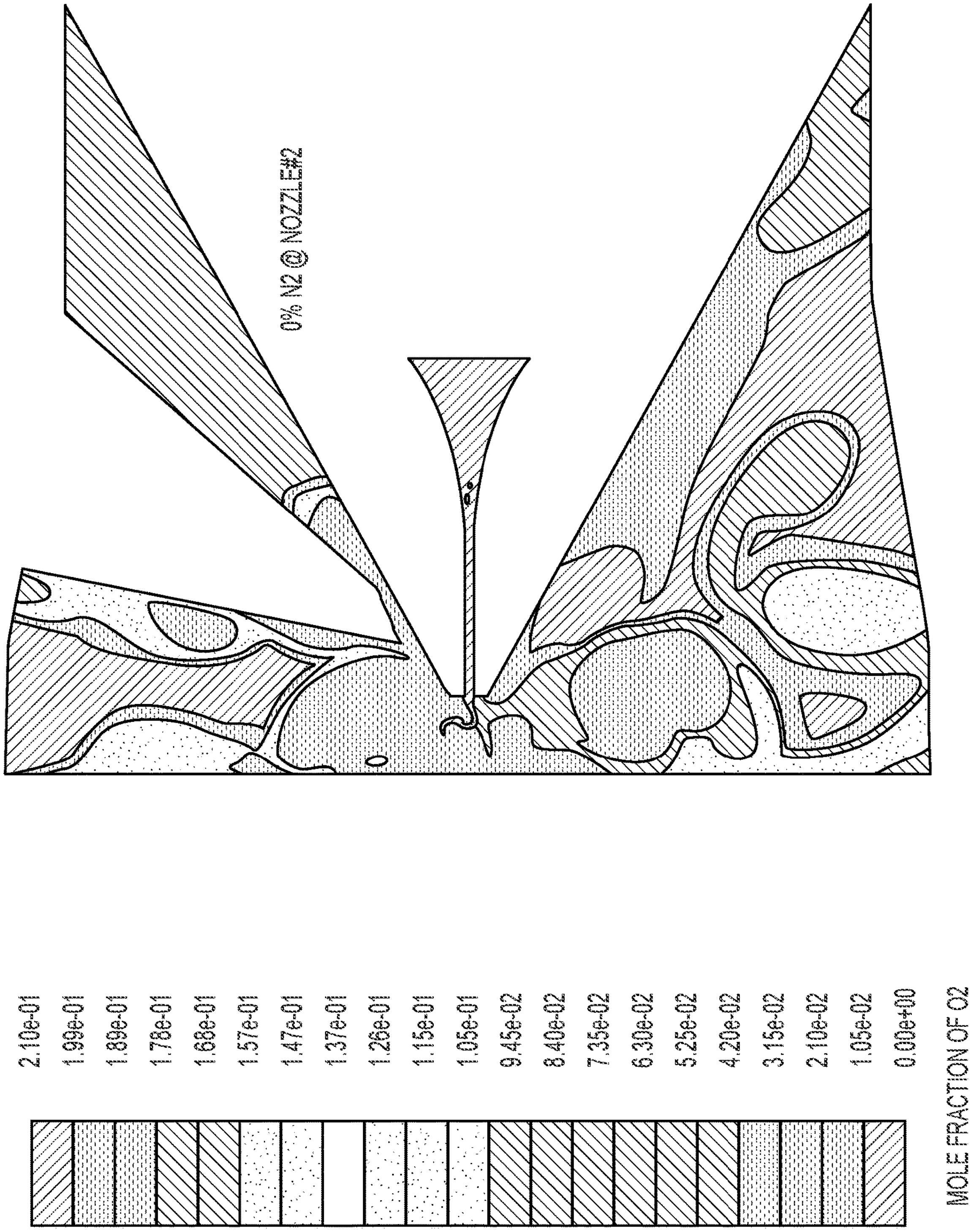
In FIG. 9A, there is no gas supplied by the second nozzle.
Figure 9B:
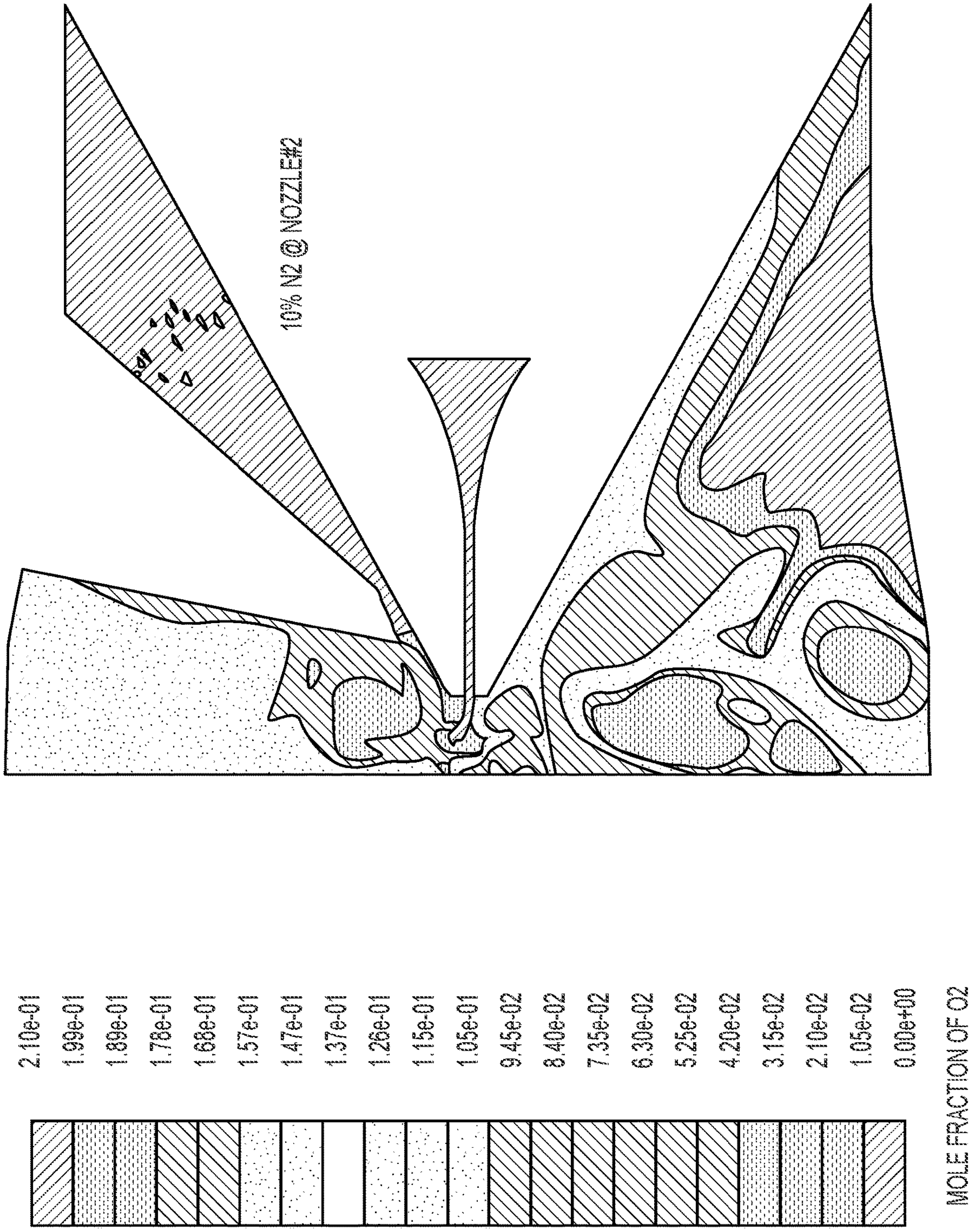
In FIG. 9B, the second nozzle gas supply is 10% of the main nozzle gas supply.
Figure 9C:
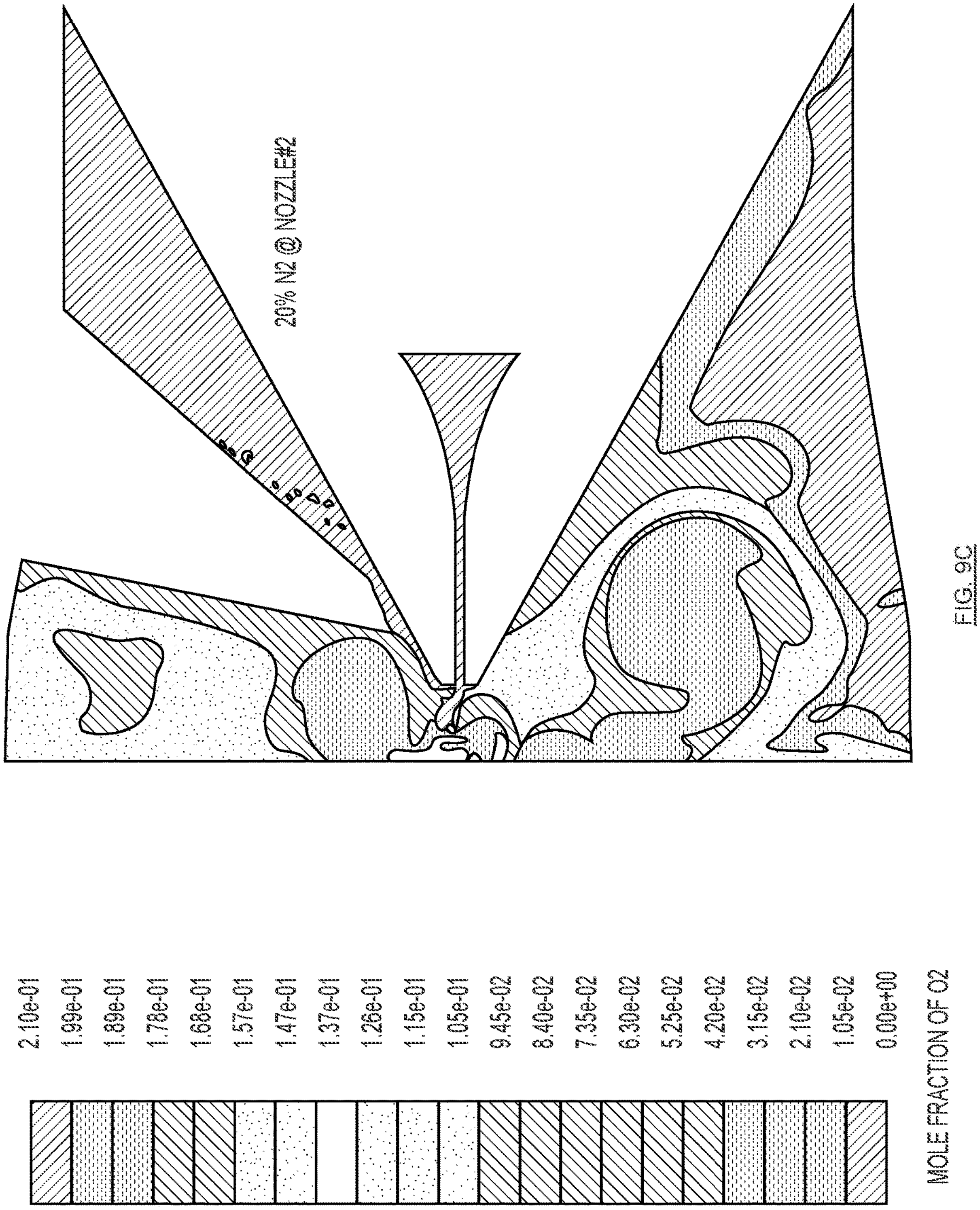
In FIG. 9C, the second nozzle gas supply is 20% of the main nozzle gas supply.

FIG. 9 represents comparative simulation diagrams of oxygen's distribution, depending on the quantity of gas supply by the second nozzle 5A, in the configuration of FIG. 7 (with two orthogonal baffle plates 14, 15). In FIG. 9A, there is no gas supplied by the second nozzle. One can see that a gas supply (i.e. gas flow rate) by the second nozzle 5A of 10% of the main nozzle 5 gas supply (FIG. 9B) already provides good and stable results in blocking the downstream oxygen drift, in comparison with a supply by the second nozzle 5A of 20% or more of main nozzle 5 gas supply (FIG. 9C). Moreover, according to jet velocities simulations, jet velocities are not expected to be much different in the three configurations above, which shows that the method of the invention has little impact on wiping efficiency.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, List of reference symbols

| | |
|---|---|
| 1 | Moving strip |
| 2 | Liquid metal pot |
| 3 | Sink roll |
| 4 | Deflecting roll(s) |
| 5 | First wiping nozzle |
| 5A | Second wiping nozzle |
| 6 | Chamber of first nozzle |
| 6A | Chamber of second nozzle |
| 7 | First nozzle opening |

-continued

| List of reference symbols | |
|---|---|
| 7A | Second nozzle opening |
| 8 | Confinement enclosure (prior art) |
| 9 | Wiping gas jet |
| 10 | Coating upstream of gas jet impingement |
| 11 | Coating downstream of gas jet impingement |
| 12 | Coating thickness |
| 13 | First nozzle upper surface |
| 13A | Second nozzle upper surface |
| 14 | Parallel baffle plate |
| 15 | Perpendicular/transverse baffle plate |
| 16 | Gas impingement spot |
| 17 | Confinement region |
| 18 | Hinge |
| 19 | Oxygen sensor |
| 20 | Actuator |

The invention claimed is:

1. A gas wiping device for controlling a thickness of a coating layer deposited on a running strip, comprising a metal strip plated with molten metal in an industrial hot-dip installation, the device comprising:

a main nozzle unit and a secondary nozzle unit, configured to blow a wiping jet on a surface of the running strip, the main nozzle unit and secondary nozzle unit respectively comprising a main and secondary chamber fed by pressurized non-oxidizing gas and at least a main elongated nozzle slot formed in a tip of the main nozzle unit and a secondary elongated nozzle slot formed in a tip of the secondary nozzle unit, each tip having an external top side facing a downstream side of the running strip and making an angle with the surface of the running strip, wherein the secondary nozzle unit is adjacent the main nozzle unit over the external top side of the main nozzle unit tip such that an upper external surface of the secondary nozzle unit forms an angle of between 5° and 45° with the surface of the running strip surface, wherein a thickness of an opening of the secondary elongated nozzle slot is between 1.5 and 3 times a thickness of an opening of the main elongated nozzle slot, wherein the external top side of the secondary nozzle unit tip is extended downstream by a first baffle plate making a first angle with respect to the running strip so as to form a gas confinement region, and wherein the gas wiping device further comprises:

an actuator configured to adjust a distance between a tip of the first baffle plate and the running strip, the first baffle plate being mounted pivotably with respect to the upper external surface of the secondary nozzle unit using a hinge, such that the actuator is configured to modify an angle between the first baffle plate and the upper external surface of the secondary nozzle unit; and an oxygen sensor in the gas confinement region, close to an opening of the secondary elongated nozzle slot of the secondary nozzle unit, the oxygen sensor being configured to measure an amount of oxygen close to the running strip, downstream of a nozzle location of the main nozzle unit, so as to provide a measurement for activating the actuator, wherein the actuator is configured to modify a geometry of the gas confinement region based on the measurement of the oxygen sensor by varying a distance in order to reduce an oxygen content in the gas confinement region or to keep the oxygen content in the gas confinement region below a predetermined threshold.

2. The device of claim 1, wherein a difference of the distance between the secondary elongated nozzle slot and the running strip and a distance between the main elongated nozzle slot and the running strip is between 5 and 30 mm.

3. The device of claim 1, wherein the first baffle plate is extended at an end distal from the tip of secondary nozzle unit by a second baffle plate making a second angle with respect to the running strip, so as to form the gas confinement region with the secondary nozzle unit tip and the first baffle plate.

4. The device of claim 3, wherein the second baffle plate is essentially transverse/perpendicular with respect to the running strip.

5. The device of claim 1, wherein an orthogonal projection of the secondary elongated nozzle slot on the running strip is located at least at 50 mm downstream of a gas impingement spot of a wiping gas of the main nozzle unit.

6. The device of claim 4, wherein an orthogonal projection of a tip of the second baffle plate on the running strip is located at least at 75 to 100 mm downstream of a gas impingement spot of a wiping gas of the main nozzle unit.

7. The device of claim 4, wherein a distance from the running strip to second baffle plate is between 5 and 30 mm.

8. The device of claim 4, wherein a distance from the running strip to the first baffle plate or a distance from the running strip to the second baffle plate is greater than a distance from the running strip to the main nozzle unit.

9. The device of claim 1, wherein the main and secondary chambers are non-communicating chambers.

10. A gas wiping system, comprising:

a plurality of transverse compartments, each compartment of the plurality of transverse compartments having the gas wiping device of claim 1, the plurality of transverse compartments being located over a width of the running strip so as to modify the gas wiping jets independently in each compartment.

11. A method for controlling the thickness of the coating layer deposited on the running strip in the industrial hot-dip installation, using the gas wiping device of claim 1, the method comprising:

blowing a first pressurized non-oxidizing gas jet through the main nozzle unit on the running strip plated with the molten metal coming out of a hot-dip pot; and blowing a second pressurized non-oxidizing gas jet through the secondary nozzle unit on the running strip plated with the molten metal coming out of a hot-dip pot, an impingement spot of the second gas jet being located close to or downstream from an impingement spot of the first gas jet with respect to a running direction of the running strip, wherein a gas flow rate coming out of the secondary nozzle unit is controlled and is less than 40 percent of a gas flow rate coming out of the main nozzle unit.

12. The method of claim 11, wherein the gas flow rate coming out of the secondary nozzle unit is between 5 and 30 percent of the gas flow rate coming out of the main nozzle unit.

13. The method of claim 12, wherein the gas flow rate coming out of the secondary nozzle unit is between 10 and 20 percent of the gas flow rate coming out of the main nozzle unit.

14. The method of claim 11, wherein a gas velocity at an exit of the secondary elongated nozzle slot is less than 50 percent of a gas velocity at an exit of the main elongated nozzle slot.

15. The method of claim 11, wherein the pressurized non-oxidizing gas comprising the first pressurized non-oxidizing gas jet and the second pressurized non-oxidizing gas jet comprises nitrogen.

* * * * *